_United States Patent_ [19]

Ohtsubo

[11] Patent Number: 4,646,180
[45] Date of Patent: Feb. 24, 1987

[54] FLOATING HEAD SLIDER
[75] Inventor: Yasuo Ohtsubo, Yokohama, Japan
[73] Assignee: Tokyo Shibaura Denki Kabushiki Kaisha, Kawasaki, Japan
[21] Appl. No.: 532,101
[22] Filed: Sep. 14, 1983
[30] Foreign Application Priority Data Sep. 30, 1982 [JP] Japan .................. 57-171728

[51] Int. Cl.⁴ .............................. G11B 17/32
[52] U.S. Cl. .................................. 360/103
[58] Field of Search ....................... 360/103, 102
[56] References Cited
U.S. PATENT DOCUMENTS 3,398,870 8/1968 Mullan ..................... 360/103 X
3,678,482 7/1972 Billawala ................... 360/103
3,823,416 7/1974 Warner .................... 360/122
3,855,625 12/1974 Garnier .................... 360/103

FOREIGN PATENT DOCUMENTS

58-5470 1/1983 Japan .
787453 12/1980 U.S.S.R. .................. 360/103

Primary Examiner—A. J. Heinz
Attorney, Agent, or Firm—Cushman, Darby & Cushman

[57] ABSTRACT

A slider for a magnetic head assembly is formed with the bottom surfaces of at least two outside elements forming an air bearing surface, and with grooves provided at both ends forming pressure-raising mechanisms. The grooves are V-shaped and preferably converge in the direction of air flow. A central pressure reducing V-shaped groove converging in the opposite direction may be provided.

11 Claims, 29 Drawing Figures

FLOATING HEAD SLIDER

BACKGROUND OF THE INVENTION

This invention relates to a floating head slider used in a magnetic storage device.

Many magnetic disc recording devices with a so-called "hard disc" as the recording medium are in use as large capacity storage devices in information processing systems. In these devices, the high speed magnetic recording and reproduction of information is effected by causing the hard disc to rotate at high speed and having a magnetic head on a floating head slider face the information recording surface of this disc with a microgap therebetween.

Figure 1:
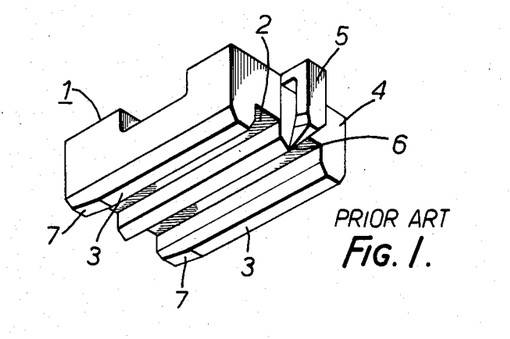
FIG. 1 is a perspective view of a conventional floating head slider.
Figure 2:
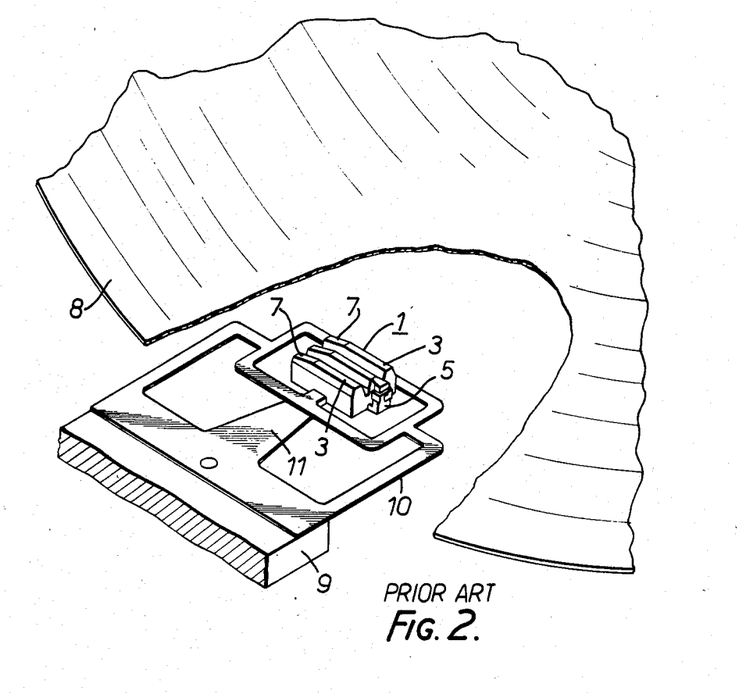
FIG. 2, a perspective view of a magnetic storage device incorporating the floating head slider of FIG. 1.

FIG. 1 shows a conventional floating head slider as described in U.S. Pat. No. 3,823,416. Two bearing surface 3 and 3' parallel to each other are formed on the underside of the floating head slider 1. A projecting magnetic head 5, its lower tip constituting a recording-/reproducing part 6, is mounted on the underside between surfaces 3 and 3'. Tapering surfaces 7 and 7', constituting a kind of pressure-raising mechanism for the air in flow along surfaces 3 and 3', are formed on one end of each of the above-mentioned bearing surfaces 3 and 3'. This kind of floating head slider 1 is in practice supported in the manner illustrated in FIG. 2. As this floating head slider in FIG. 2 faces the underside of the disc 8 which constitutes the storage medium, the direction in which it is facing is in fact the opposite of that in FIG. 1. In FIG. 2, the floating head slider 1 is supported by a set of gimbals 10 which is itself supported by a mounting arm 9, and is thrust by a leaf spring 11 (integral with the gimbals 10) in the direction required for pressure contact with disc 8.

Figures 3A, 3B:
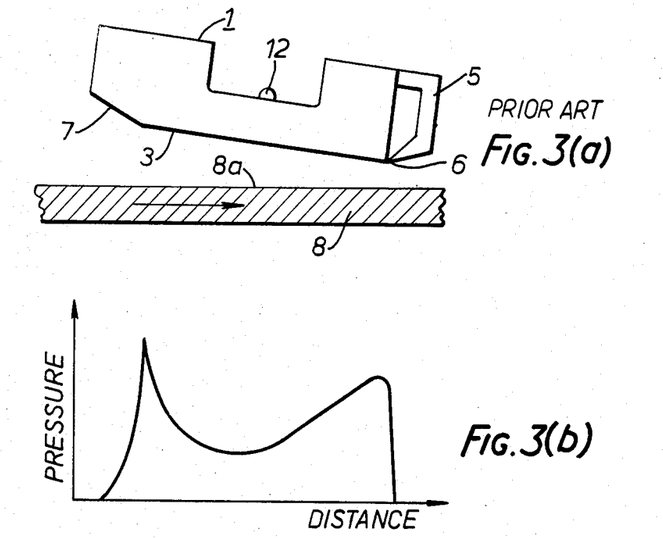
FIG. 3(a), a side view of the floating head slider of FIG. 1 while floating.
FIG. 3(b), a diagram of the pressure distribution for the slider of FIG. 3(a)

When disc 8 is stationary, floating head slider 1 touches the surface of the disc and when disc 8 starts to rotate, the tapering surfaces 7 and 7' which constitute the pressure-raising mechanism cause it to separate from the disc, i.e. to float, as shown in FIG. 3(a). Under these conditions the pressure distribution pattern along the bearing surfaces 3 and 3' is as indicated in FIG. 4(b). The application to the point of support 12 of the floating head slider 1 by leaf spring 11 of a thrust equivalent to the integral of the generated pressure shown in FIG. 3(b) causes the gap between the recording/reproducing part 6 of the floating head slider 1 and the surface 8a of the disc 8 to be kept constant. This gap between the recording/reproducting part 6 of the floating head slider 1 and the surface 8a of the disc is highly important in achieving stable recording and reproduction characteristics.

In order to achieve good recording quality by improving the tracking of the floating head slider 1 of the disc 8, it is best to make the above mentioned gap narrow. However, if a large thrust is applied to the magnetic head slider so as to narrow the gap, the friction between the bearing surfaces 3 and 3' of the magnetic head slider 1 and the surface 8a of the disc 8 during low speed running (when the disc 8 is being started or stopped) is intensified, resulting in increased abrasion of the surfaces 3 and 3' and therefore shortening the life of the magnetic storage device.

One way of eliminating this drawback is not to apply the thrust to the floating head slider 1 when the disc 8 is running at low speed, and to apply it only when the speed is above a certain value. However, a mechanism to effect this is expensive, and the risk exists of the bearing surfaces 3 and 3' of the slider 1 colliding with the surface 8a of the disc 8 when the floating head slider 1 is brought closer to the disc 8 during running. This solution, therefore, is not really practicable.

Figures 4, 5:
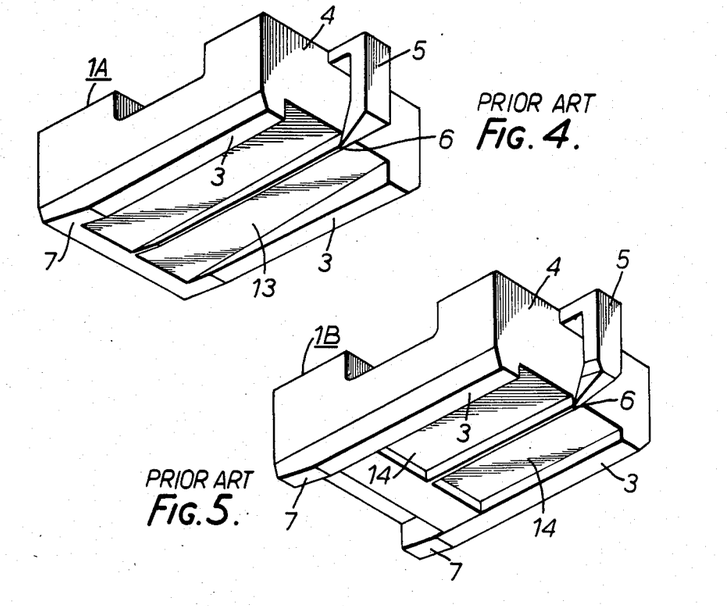
FIGS. 4 and 5, perspective views of other conventional floating head sliders.

Other possible solutions are to provide, as illustrated in FIG. 4, and shown in U.S. Pat. No. 3,855,625 tapered recesses 13 in the central area of the underside of the floating head slider 1a, or, as shown in FIG. 5, stepped recesses 14 at the air outflow end of the central area of slider 1b, to lessen the frictional abrasion between the bearing surfaces 3 and 3' of the floating head sliders 1a and 1b and the surface 8a of the disc 8 when the disc is starting or stopping by causing negative pressure to be generated during running, and so applying a reduced thrust.

However, the provision of a tapered recess or a stepped recess requires additional processing, and therefore increases the cost of manufacture.

SUMMARY OF THE INVENTION

An object of this invention is to provide a floating head slider for use in a magnetic storage device in which abrasion is minimal and a very narrow gap can be maintained between the head and the surface of the recording medium, and which can be manufactured at low cost.

In the floating head slider of this invention, the object stated above is achieved by, in addition to the provision of a magnetic head forming in a floating head slider in which bearing surface are formed on the side facing the recording medium pressure-raising grooves at the air inflow end and at the outflow end of the bearing surfaces.

The grooves preferably converge to a tip in the direction of air flow and are preferably formed by ion etching an exposed photosensitive layer. A central groove converging in the opposite direction can be provided for a negative pressure raising at that location.

BRIEF DESCRIPTION OF THE DRAWINGS

FIGS. 12(a) and (b) the properties of the pressure-raising grooves;

FIGS. 13(a) and (b) the properties of the pressure-reducing grooves;

FIGS. 14(a) and (b) side views showing variations of the embodiment of FIG. (6);

DETAILED DESCRIPTION OF THE INVENTION

Figures 6A, 6B:
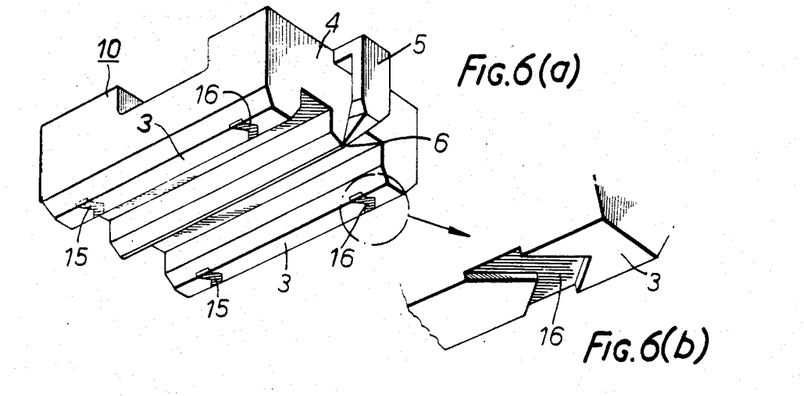
FIG. 6(a) a perspective view showing an embodiment of the floating head slider of the present invention.
FIG. 6(b) an enlarged drawing of an important detail of FIG. 6(a)
Figure 7A:
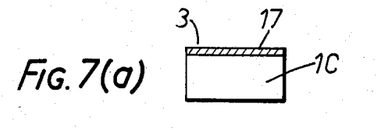
FIGS. 7(a)–(g), illustrations of the process of etching the grooves in the floating head slider of FIG. 6.
Figure 7B:
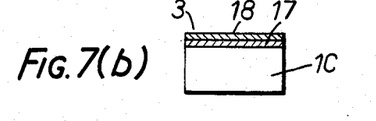
Figure 7C:
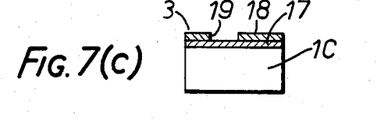
Figure 7D:
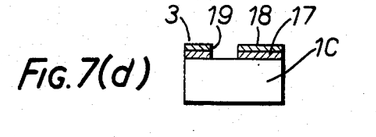
Figure 7E:
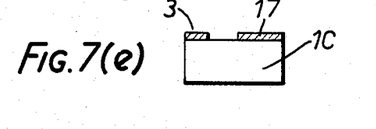
Figure 7F:
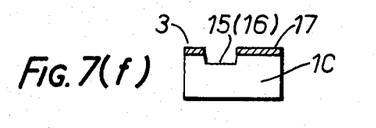
Figure 7G:
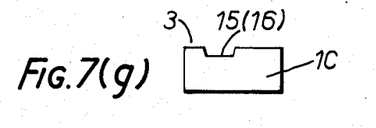

FIG. 6(a) and (b) are perspective views showing in outline the configuration of the floating head slider of this invention; the same symbols are used for the parts which are the same as in the conventional slider depicted in FIG. 1. This floating head slider has on the bearing surfaces 3 and 3' of the body of the slider which face the magnetic recording medium, in place of the conventional tapering surfaces 7 (in FIG. 1), pressure-raising grooves 15 and 16 which converge to a tip in the direction of air flow at the air inflow and air outflow ends of the bearing surfaces 3 and 3' of the floating head slider 1c. These grooves 15 and 16 divide the bearing surfaces 3 and 3' into three equal parts and are preferably formed by ion etching.

An explanation of the ion etching process follows, referring to FIG. 7. First, as illustrated in FIG. 7(a), a metal film 17 is evaporated onto the underside 2 and bearing surfaces 3 and 3' of the floating head slider 1c. This metal film 17 is then coated with photosensitive material 18, as shown in FIG. 7(b). Next the pattern 19 of the groove 15 or 16 is formed by exposure (FIG. 7(c)), after which the metal film 17 is etched (FIG. 7(d)), and the photosensitive material 18 removed (FIG. 7(e)). Ferrite etching is the next step (FIG. 7(f)), and the groove 15 or 16 is left when the metal film 17 is removed (FIG. 7(g)).

With the ion etching method, reproducability of the finished product dimensions is better than with mechanical working. Also, the dimensional accuracy desired in the details of the pattern can be achieved by the selection of an appropriate scale of enlargement for the original drawing. Moreover, the rate of etching being low (1–2 $\mu$m/hr), a high level of precision in the depth of the grooves 15 and 16 of $\pm 0.1$ $\mu$m can be obtained by adjustment of the process time.

Figures 8A, 8B:
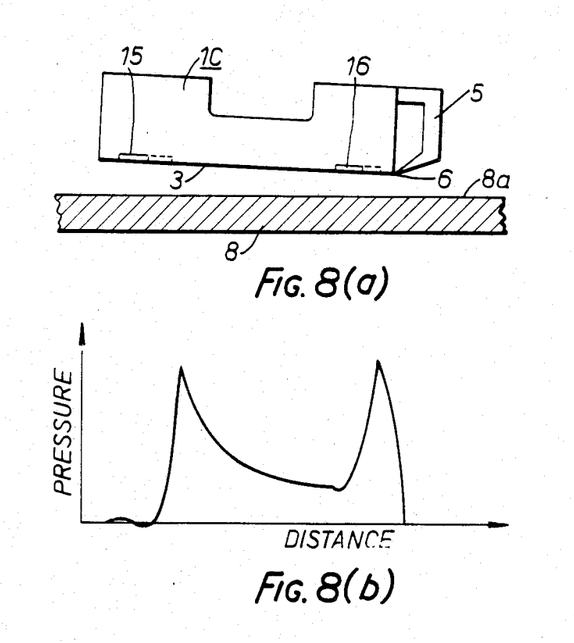
FIG. 8(a), a side view of the floating head slider of FIG. 6 while floating.
FIG. 8(b), a diagram of the pressure distribution for the slider of FIG. 8(a)

FIGS. 8(a) and (b) show the position of the floating head slider of the embodiment illustrated in FIGS. 6(a) and (b) when floating, and the pressure distribution at the time. Notwithstanding the fact that the slider 1c is floating with the gap between it and the surface 8a of the disc 8 approximately the same at the air inflow end and the air outflow ends, the pressure distribution exhibits maximum values at the positions of the front and back grooves 15 and 16 (FIG. 8(b)).

As detailed below, the pressure-raising grooves 15 and 16 have a shape which converges to a tip in the direction of airflow. Consequently, when the air flowing from the forward direction of relative movement between the bearing surface 3 and the disc 8 enters the aforementioned pressure-raising grooves 15 and 16, it is progressively compressed toward the closed tips of the grooves. The forces of the compressed air, as the air escapes over the trailing edge of each groove, trying to return to its former state, generates a lifting force (positive differential pressure) which works to raise the slider.

As the gap between the recording/reproducing part 6 of the magnetic head 5 and the surface 8a of the disc 8 is more constant the more nearly parallel the floating head slider 1c and the disc 8, the tracking by the slider 1c of the disc 8 will be better with a consequent improvement in recording/reproducing characteristics. This effect reduces the occurrence of crashes of the floating head slider 1c. Further, since as already mentioned the pressure distribution shows maximum values in two places, the floating head slider 1c is also stable in the pitching direction.

Figures 9A, 9B:
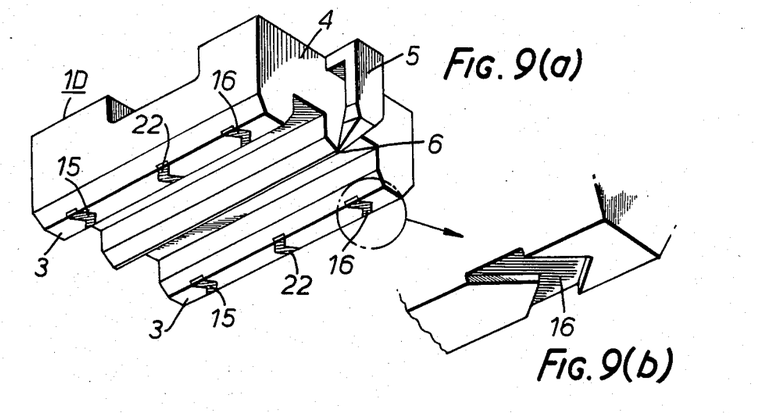
FIG. 9(a), a perspective view of another embodiment of the present invention.
FIG. 9(b), an enlarged drawing of an important detail of FIG. 9(a)

FIGS. 9(a) and (b) show another embodiments of the floating head slider 1D of this invention. A V-shaped groove 22 with its ends opening out in the opposite direction is formed by etching as a pressure-reducing mechanism in the central region between the grooves 15 and 16 formed on each of the bearing surface 3 and 3' in FIGS. 6(a) and (b) as already described. The bearing surfaces 3 and 3' are each therefore divided into four equal parts by the three grooves 15, 16, and 22.

Figure 10A:
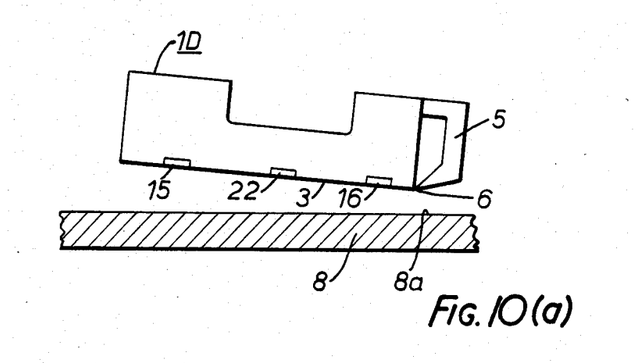
FIG. 10(a), a side view of the floating head slider of FIG. 9.
Figure 10B:
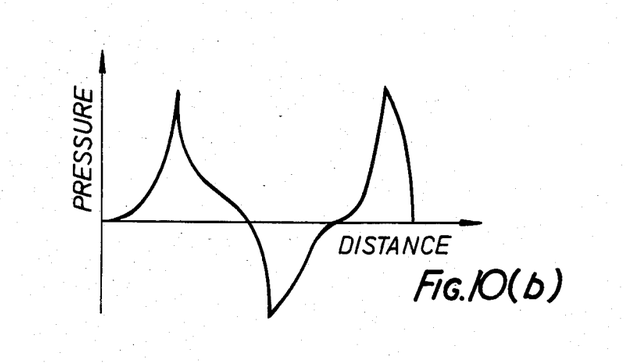
FIG. 10(b), a diagram of the pressure distribution of the further slider of FIG. 10(a)

FIGS. 10(a) and (b) show the position of a floating head slider 1D of this construction when it is floating, and the pressure distribution. The floating head slider 1D expriences maximum positive pressure at the grooves 15 and 16 at the air inflow and air outflow ends of the bearing surface 3 and 3' and maximum negative pressure at the groove 22 between grooves 15 and 16. Air entering the pressure-reducing grooves 22 undergoes progressive expansion, opposite to what takes place in the pressure-raising grooves 15 and 16. As a result, a negative differential pressure is generated which, in order to restore equilibrium with atmospheric pressure, works to reduce the effective cross-sectional area of the grooves. The floating head slider 1D floats over the surface 8a of the disc 8 with a flotation gap controlled by the pressure difference between the positive pressure of grooves 15 and 16 and the negative pressure of the grooves 22.

Since the applied thrust is equivalent to the integral of the total pressure generated, where, as in this embodiment, a pressure reducing groove 22 is provided, thrust applied upon the surface 8 need be only about half the thrust required without groove 22. Therefore abrasion of the bearing surfaces 3 and 3' of the floating head slider 1D and the surface 8a of disc 8 can therefore be very considerably reduced during low speed running of disc 8. Also, since the positive maximum values occur at the two ends of the bearing surface 3 and 3', the stability of the floating head slider 1D in the pitch direction is good. The configuration of the aforementioned grooves 15, 16, and 22 is such that they converge to a tip or open out in the backward direction of air movement relative to disc 8.

Figure 11A:
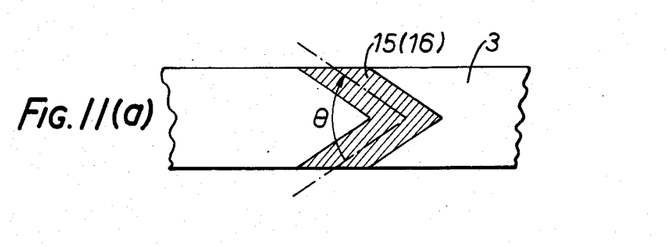
FIGS. 11(a)-(d), explanatory drawings showing examples of different shapes of grooves.
Figure 11B:
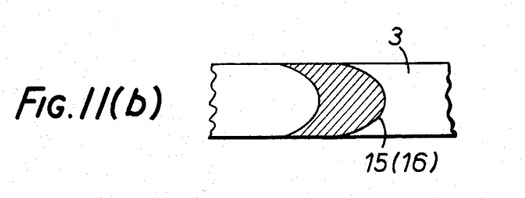
Figure 11C:
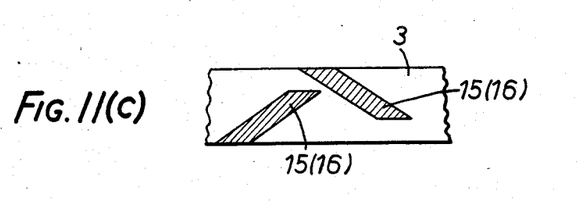
Figure 11D:
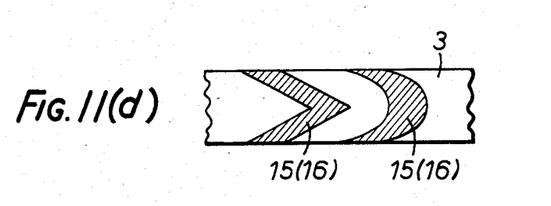

Typically, the shape is that of a V as shown in FIG. 11(a). If the angle $\theta$ as shown in FIG. formed at the center of this kind of V-shaped groove is defined by the included angle, the pressure differential generated at the bearing surfaces 3 and 3' will vary according to this included angle $\theta$. The grooves may also be formed in various other shapes as illustrated in FIGS. 11(b)-(e). The surfaces defining each groove may be curved as shown in FIG. 11(b). The grooves may extend from only one side as shown in FIG. 11(c). Combinations of V shaped and curved grooves may be employed.

Figure 12:
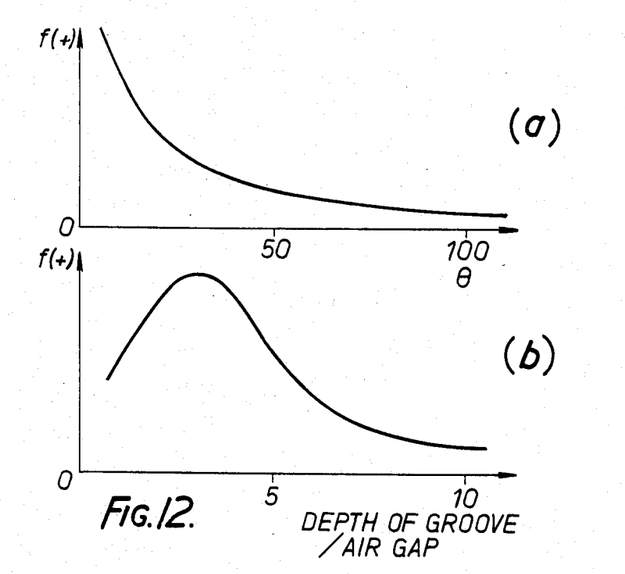
Figure 13:
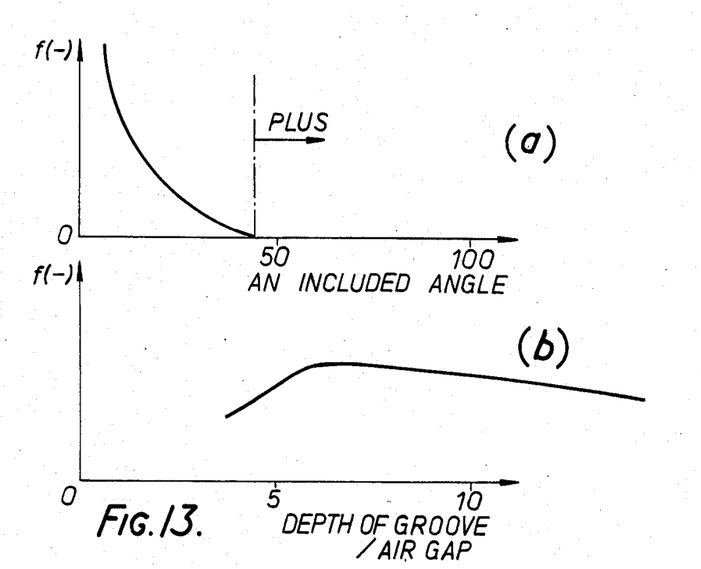

FIG. 12(a) shows the relation between the included angle θ in the pressure raising grooves and the generated positive pressure differential f(+) and FIG. 13(a), the relation between the included angle θ in the pressure reducing grooves and the generated negative pressure differential f(−). In the case of the pressure raising grooves, the smaller the included angle θ, the greater the lifting force, i.e. pressure differential f(+), that can be obtained.

On the other hand, reducing the size of the included angle θ means that the length of the bearing surfaces 3 and 3' that is occupied by the grooves in the lengthwise direction is increased, which introduces a limitation on the positions where the grooves can be formed. Consequently, when regulating the pressure to be generated by means of this angle θ, it is preferable to limit the included angle θ to between 10° and 100° as the range of practical usefulness.

The configuration of the pressure-reducing groove 22 is reverse to the configurations shown in FIG. 11. In the case of the pressure-reducing grooves, as FIG. 13(a) indicates, negative pressure differential f(−) is generated when the included angle θ is less than approximately 50°. When the angle is larger, a positive pressure differential is generated. This is determined by the balance between the negative pressure produced by the inflow of air to the grooves and the positive pressure difference arising from their existence. To increase the aforementioned negative pressure difference the included angle should be made as small as possible. Consequently, when considering the degree of freedom in the forming of the pressure-reducing grooves, it is desirable to set this included angle θ with a range of 10°–45°.

The pressure difference generated by pressure-raising and pressure-reducing grooves with their included angle θ set in this way is greatly influenced by the depth of grooves. FIG. 12(b) shows the relation of the pressure difference generated to the depth of the pressure-raising grooves while FIG. 13(b) shows the relation of the pressure difference generated to the depth of the pressure-reducing grooves. Groove depth is shown as normalized by dividing it by the flotation gap between the bearing surfaces 3 and 3' and the disc 8, i.e. the microgap. As FIG. 12(b), shows, the pressure differential f(+) obtained by the pressure-raising grooves is maximum when the depth of the grooves is set at about 3 times the flotation gap. Consequently, if the pressure-raising grooves are of a depth to obtain this peak value, their pressure-generating effifiency will be extremely good.

Bearing in mind the possibility of inaccuracies in groove depth during the making of the grooves, it is preferable to choose a region in the neighborhood of the peak, where the sensitivity of pressure differential generation to groove depth is small. Taking this into account, the pressure difference required will be obtained in practice by setting the depth of the pressure raising grooves at 2–10 times the aforementioned floating gap, allowing for any inclination of the bearing surface 3 and 3' to the disc 8. In particular if the depth is set at 1.5–5.0 times the aforementioned gap, a lifting force will be obtained, by which the floating gap can be most effectively controlled.

The properties associated with groove depth can be utilized in an opposite way, e.g. to keep the lifting force low by setting the depth at 5–20 times the floating gap. This approach can be applied to good effect when the lifting force is too great in relation to the area of the bearing surfaces 3 and 3', giving rise to abrasion. The reason why the upper limit of this range has been set at 20 is that it seems univise to make the grooves too deep, owing to the problems of accuracy and working time that might arise when the grooves are being made.

The characteristic curves of the pressure difference generated by the pressure-reducing groove on the other hand, is relatively level, as FIG. 13(b) indicates, but it does have a peak when groove depth is about six times the flotation gap. Consequently, if from the point of view of balance with pressure differential f(+) generated by the aforementioned pressure-raising grooves, the depth of these pressure-reducing grooves is set at e.g. 5–20 times the flotation gap, negative differential pressure f(−) can be produced in a stable manner, making efficient use of the air flowing into the grooves.

If, therefore, the depth of the pressure-raising grooves is now set at 1.5–5.0 times the flotation gap and that of the pressure reducing grooves at 5–20 times the flotation gap, a net positive pressure difference is generated as a result of the inflow of air, and the desired flotation gap (microgap) can be obtained in a stable manner. In addition, dynamic stability can be considerably increased. It is desirable that depth of the pressure-reducing grooves in practice should be set at least twice that of the pressure-raising grooves.

Figure 14:
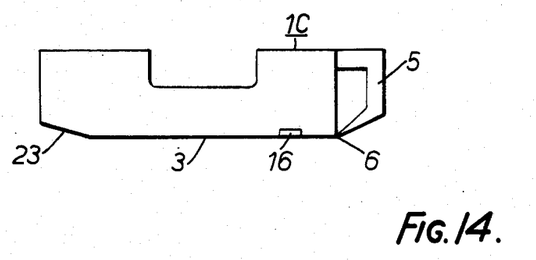
Figure 15:
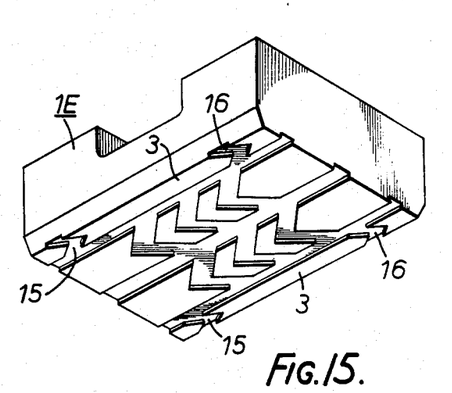
FIG. 15, a perspective view showing a variation of the embodiment of FIG. 9.

With a floating head slider provided with pressure-raising and pressure-reducing grooves of the kind described above on its bearing surface, the two types of grooves operate synergistically in relation to the recording medium to produce the following effect. When the disc 8 is stationary, the bearing surfaces 3 and 3' of the slider are in contact with the surface of the disc 8 recording medium. When the disc 8 starts to move, or when it is about to stop and the speed of the disc 8 in relation to the slider is low, the effect of the pressure-raising grooves dominate. By this means the body 2 of the slider is subjected to a lifting force and is lifted so that the predetermined micrograp between it and the disc 8 is formed. When the disc 8 is revolving at a steady high speed, and the aforementioned relative speed is high, the pressure-reducing grooves start to function, in addition to the pressure raising grooves. The result is that the negative pressure differential of the pressure-reducing grooves operates to reduce the lifting force generated by the pressure-raising grooves, and the microgap previously referred to is maintained at a constant value between the bearing surface 3 and 3' and the disc 8. In short, the lifting force produced by the pressure-raising grooves and the negative pressure differential produced by the pressure-reducing grooves interact with each other in a stable manner to form the aforementioned microgap. Because the aforementioned flotation gap, between the slider and the disc 8, is controlled by the pressure differences generated by these grooves, there is no need to apply any downthrust, as has been necessary hitherto, and the device is self-stabilizing to a high degree. Moreover, since as stated above each type of groove controls the position of the slides by generating its pressure, differential stability in the pitching direction is extremely good. This makes possible a high standard of magnetic recording and reproduction of the magnetic head. Further, since the slider can be floated in a stable manner, abrasion by the recording medium can be greatly reduced. This means that the reliability of the device can be maintained over a long priod, and makes possible stable operation. Furthermore, the grooves described above can be formed easily and with a high degree of precision by an etching technique, as mentioned earlier. Manufacture is therefore easy; the floating head slider can be produced cheaply and with a good yield rate. These practical advantages are very great. The pressure-raising mechanism is not restricted to the grooves 15 and 16 described above, since tapering surfaces and stepped surfaces can also be employed. Thus a tapering part 23 can be provided at the air inflow end, as shown in FIG. 14(a), combined with a groove 16 at the air outflow end; or a step 24 can be similarly combined, as shown in FIG. 14(b). Also, pressure-reducing grooves 22 can be provided, as shown in FIG. 15, in the central part of the floating head slider 1e in the width direction.

As explained above, the floating head slider of this invention makes possible a floating head slider in which, in addition to the provision of a magnetic head, bearing surfaces are provided on the side facing the recording medium, and because pressure-raising mechanisms are formed at the air inflow and air outflow ends of the said bearing surfaces, not only is stability in the pitching direction maintained but also for the bearing surfaces to face the recording medium virtually parallel with it and with a minimal gap therebetween, reducing abrasion and obtaining high resolution recording.

Moreover, the applied thrust required can be further reduced by (in addition to the construction described above) forming a pressure-reducing groove on each of the bearing surface between the pressure-raising mechanisms at the air inflow and air outflow ends. This groove further reduces abrasion to a corresponding degree.

What is claimed:

1. A floating head slider having a magnetic head for transducing information at a magnetic recording surface during relative movement between the magnetic head and the recording surface, there being a floatation gap between said magnetic head and said recording surface, said floating head slider comprising:
    a magnetic slider body including first, second and third depending, longitudinally extending members, being essentially parallel to the direction of said relative movement, each having first and second ends, each having a peripheral surface closest to said recording surface, generally parallel and laterally spaced apart, with said first and third members being exterior to said second member, said peripheral surface of at least said two exterior members having at said peripheral surfaces, air bearing surfaces, and at said first and second ends of said members grooves are formed at said air bearing surfaces to provide air pressure-raising mechanisms; and
    a magnetic head aligned with said second member.

2. The floating head slider as in claim 1, wherein said grooves converge to a tip forming the vertex of an angle $\theta$, in the direction of said relative movement of said recording surface.

3. The floating head slider as in claim 2, wherein said angle $\theta$ formed by said grooves is between 10° to 100°.

4. The floating head slider as in claim 2, wherein the depth of said grooves is between 1.5–5.0 5.0 times said flotation gap during said relative movement.

5. The floating head slider as in claim 1, wherein said grooves formed on each of said air bearing surfaces divide each air bearing surface into substantially three equal portions.

6. A floating head slider having a magnetic head for transducing information at a magnetic recording surface during relative movement between the magnetic head and the recording surface there being a flotation gap between said magnetic head and said recording surface, said floating head slider comprising:
    a magnetic slider body including first, second and third depending, longitudinal members, being essentially parallel to the direction of said relative movement, each having first and second ends, each having a peripheral surface closest to said recording surface, generally parallel and laterally spaced apart, with said first and third members being exterior to said second member, said peripheral surface of at least said two exterior members having at said peripheral surfaces, air bearing surfaces, and at said first and second ends of said members, at said air bearing surfaces, there being means for air pressure-raising including grooves located adjacent said first and second ends in said members, and at a point substantially equal distant from said first and second ends of said members, there being at said air bearing surfaces, means for reducing air pressure; and
    a magnetic head longitudinally aligned with said second member.

7. The floating head slider as in claim 6, wherein said pressure-raising means includes grooves which converge to a tip forming the vertex of an angle $\theta$, said grooves being pointed in the direction of said air flow, and said pressure-reducing grooves includes grooves which converge to form an angle $\theta$, said grooves being pointed in the opposite direction to said relative movement of said recording surface.

8. The floating head slider as in claim 7, wherein said angle $\theta$ formed by said pressure-raising grooves is between 10° and 100° and the angle $\theta$ formed by said pressure-reducing grooves is between 10° to 45°.

9. The floating head slider as in claim 7, wherein the depth of said pressure raising grooves is between 0.5–5.0 times said flotation gap and the depth of said pressure reducing grooves is between 5–20 times said flotation gap during said relative movement.

10. The floating head slider as in claim 7, wherein the depth of said pressure-reducing grooves is more than 2 times that of said pressure-raising grooves.

11. The floating head slider as in claim 6, wherein said pressure-reducing grooves and two pressure-raising means divide said air bearing surfaces of said first and third members into substantially equal four parts.

* * * * *